US006547382B1

(12) United States Patent
Shirota et al.

(10) Patent No.: US 6,547,382 B1
(45) Date of Patent: Apr. 15, 2003

(54) INK SET AND IMAGE FORMING METHOD USING THE SAME

(75) Inventors: Katsuhiro Shirota, Kanagawa (JP); Hidemi Kubota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/128,482

(22) Filed: Apr. 24, 2002

(30) Foreign Application Priority Data

May 10, 2001 (JP) ........................................ 2001-140466

(51) Int. Cl.$^7$ ................................................ G01D 11/00
(52) U.S. Cl. ........................................................ 347/100
(58) Field of Search ............................. 347/100, 96, 98

(56) References Cited

U.S. PATENT DOCUMENTS

| | | | |
|---|---|---|---|
| 4,538,160 A | 8/1985 | Uchiyama | 356/140 |
| 6,450,632 B1 * | 9/2002 | Tsang et al. | 347/96 |

FOREIGN PATENT DOCUMENTS

| | | |
|---|---|---|
| JP | 58-128862 | 8/1983 |
| JP | 63-60783 | 3/1988 |
| JP | 64-69381 | 3/1989 |

\* cited by examiner

*Primary Examiner*—John Barlow
*Assistant Examiner*—Michael S Brooke
(74) *Attorney, Agent, or Firm*—Fitzpatrick, Cella, Harper & Scinto (57) ABSTRACT

The present invention relates to an ink set capable of achieving a further improvement in quality of an image formed on commercial plain paper. The ink set includes a combination of a recording performance improving liquid for improving the recording performance of ink jet ink, and ink jet ink for forming an image on a recording medium by an ink jet recording method, wherein the recording performance improving liquid contains at least cationic resin fine particles, the ink jet ink contains an organic pigment as a colorant, and the difference between the zeta potentials of the recording performance improving liquid and the ink jet ink is 30 mV or more.

6 Claims, 2 Drawing Sheets

INK SET AND IMAGE FORMING METHOD USING THE SAME

BACKGROUND OF THE INVENTION

1. Field of the Invention

The present invention relates to an ink set and an image forming method, and particularly to an ink set and an image forming method preferably using an ink jet recording method for applying at least an ink to a recording medium, and capable of forming a high quality image on plain paper used as the recording medium at a high speed.

2. Description of the Related Art

The ink jet recording method is conventionally used for a printer, a copying machine, and the like because of low noise, low running cost, ease of miniaturization of an apparatus, ease of formation of a color image, etc.

These printing apparatuses using the ink jet recording method have recently been made capable of forming color images of high quality equivalent or substantially equivalent to photographs. However, various ink jet recording techniques have been proposed for the user's requests to further improve the quality of an ink jet recorded image and increase the speed of ink jet recording.

For example, Japanese Patent Laid-Open No. 58-128862 discloses an ink jet recording method in which the position of an image to be printed is previously determined, and a printing ink and a treatment solution are printed to overlap each other. In this method, the treatment solution is printed before the printing ink is printed, a recording performance improving liquid is superposed on the printing ink previously printed, or the printing ink is superposed on the treatment solution previously printed, and then the treatment solution is further superposed on the printing ink. Similar printing methods are disclosed in Japanese Patent Laid-Open Nos. 63-60783, 64-69381, etc. However, according to the research by the inventors, any one of the above methods cannot be said to be sufficient to further improve the quality of a recorded image, e.g., sufficient to highly satisfy the characteristics such as feathering, bleeding, a coloring property, and a fixing property. Also, these methods cannot be said to cope with variations in image quality and the fixing speed according to the type of the recording medium used.

SUMMARY OF THE INVENTION

It is an object of the present invention to provide an ink set and an image forming method capable of highly stably satisfying requirements for the characteristics such as feathering, bleeding, a fixing property and a color tone even when images are formed on various recording media, for example, various types of commercial plain paper.

The object of the present invention is achieved by the following construction. In an aspect of the present invention, an ink set comprises a combination of a recording performance improving liquid for improving the recording performance of ink jet ink, and ink jet ink for forming an image on a recording medium by an ink jet recording method, wherein the recording performance improving liquid contains at least cationic resin fine particles, the ink jet ink contains an organic pigment as a colorant, and the difference between the zeta potentials of the recording performance improving liquid and the ink jet ink is 30 mV or more.

In another aspect of the present invention, an image forming method of forming an image using the above-described ink set comprises (i) the step of applying an ink jet ink constituting the ink set to a recording medium by an ink jet method, and (ii) the step of applying a recording performance improving liquid constituting the ink set to the recording medium, wherein the steps (i) and (ii) are performed so as to bring the ink and the recording performance improving liquid into contact with each other on the recording medium.

As a result of intensive research for solving the problem of the conventional techniques, the inventors found that ink jet recording using an ink set having the above construction permits the satisfactory resolution of the problem of feathering when a color image is formed on a recording medium referred to as "plain paper", the problem of bleeding between different color inks applied on the recording medium, and the problem of difficulties in decreasing the fixing time in recording. This resulted in the achievement of the present invention. It was also found that the image forming method using the ink set of the present invention could obtain a clear recorded image having a good coloring property. In the present invention, the recording performance improving liquid represents a liquid having the function to improve coloring of a colorant, feathering, bleeding, and the fixing property in ink jet recording.

Further objects, features and advantages of the present invention will become apparent from the following description of the preferred embodiments with reference to the attached drawings.

DESCRIPTION OF THE PREFERRED EMBODIMENTS

The present invention will be described in further detail below with reference to preferred embodiments.

An ink set according to a first embodiment of the present invention is used in an ink jet recording system. The ink set comprises a combination of a recording performance improving liquid for improving the recording function of an ink jet ink, and an ink jet ink for forming an image on a recording medium by the ink jet recording system. The recording performance improving liquid contains at least cationic resin fine particles, and the ink jet ink contains an organic pigment as a colorant. The difference between the zeta potentials of the recording performance improving liquid and the ink jet ink is 30 mV or more.

In the ink set of the present invention, the difference between the average particle diameter of the resin fine particles, which is measured by, for example, a laser Doppler method, and the average particle diameter of the organic pigment used for the ink is preferably 0.15 µm or less.

In the ink set of the present invention, the recording performance improving liquid preferably contains a cationic surfactant or both a cationic surfactant and a nonionic surfactant. In the ink set of the present invention, the recording performance improving liquid contains a polyvalent metal ion, a cationic surfactant and a polyvalent metal ion, or a cationic surfactant, nonionic surfactant and a multivalent metal ion. In another embodiment of the present invention, an image forming method uses the above-described ink set of the present invention for forming an image, and the recording performance improving liquid preferably contains a polyvalent metal ion or a cationic surfactant and a polyvalent metal ion. This can increase the fixing speed of an image portion recorded with the ink set. As a result, the ink set of the present invention can be sufficiently applied to ink jet recording by, for example, a single pass. Since the resin fine particles are used as cationic fine particles, little gelation occurs in the recording performance improving liquid even in a mixed system of the cationic surfactant and the polyvalent metal ion.

Ink jet recording using the ink set of this embodiment can highly satisfy requirements for the characteristics of ink jet recorded images, such as feathering when a color image is formed on, for example, a recording medium referred to as "plain paper", bleeding between different color inks applied to the recording medium, and the fixing time during recording. Also, the image forming method of the present invention can obtain a clear recorded image having a good coloring property.

In order to attain the above-described remarked effects, it is very important to use a combination of the recording performance improving liquid containing cationic fine particles and the ink containing an organic pigment as a colorant, and control the difference between the zeta potentials of the recording performance improving liquid and the ink to 30 mV or more.

When an image is formed by using an ink set having the above-described construction, for example, the ink is first applied to a recording medium, and then the recording performance improving liquid is applied to the ink or the periphery thereof. Consequently, the cationic fine particles contained in the recording performance improving liquid react with the pigment fine particles contained in the ink on the recording medium to rapidly decrease dispersibility of each of the components, precipitating some of the reaction products. At the same time, the recording performance improving liquid and the liquid components of the ink, such as water, an organic solvent, and the like, are separated from the particles. The separated liquid components rapidly permeate into paper due to the action of the surfactant contained in the recording performance improving liquid.

In the use of the ink set of the present invention having the above construction, the above-described phenomenon occurs on paper (recording medium), thereby making it possible to significantly satisfy feathering, bleeding and the fixing property. Also, a printed matter having good coloring can be possibly obtained because the colorant is fixed to the surface of paper. The investigation carried out by the inventors revealed that the difference between the zeta potentials of the recording performance improving liquid and the ink used in a combination during the formation of an image is a very important factor of the above phenomenon. The investigation also revealed that in order to obtain the above-described excellent effects, the cationic fine particles contained in the recording performance improving liquid must have high reactivity to the pigment particles contained in the ink, and it is thus important to control the difference between the zeta potentials of the recording performance improving liquid and the ink to 30 mV or more. The reason why the above-mentioned effects are achieved by this construction is not known. However, by controlling the difference between the zeta potentials of the recording performance improving liquid and the ink to 30 mV or more, reaction between the cationic fine particles in the recording performance improving liquid and the pigment particles in the ink are further accelerated to cause adsorption of the pigment particles on the surfaces of the cationic fine particles until the pigment particles in the ink jet ink are brought into a dispersion state or a state close to the dispersion state. This possibly prevents the occurrence of deterioration in chroma, which is observed when organic pigment particles are agglomerated.

In the present invention, the zeta potential can be measured by a conventional known measuring method. More specifically, the zeta potential is preferably measured by a laser Doppler method in which the speed of particles moving in a magnetic field is measured by using Zetablas (produced by Nikkiso Co., Ltd.). In this measuring method, for example, an ink is diluted with pure water until the concentration of fine particles of a pigment or the like is about 1 to 100 ppm, and then subjected to ultrasonic treatment for 3 minutes, and the resultant solution is used as a test sample.

A description will now be made of the components, used for the recording performance improving liquid and the ink jet ink constituting the ink set of the present invention.

(Recording Performance Improving Liquid)

First, the cationic fine particles contained in the recording performance improving liquid are described. Although the cationic fine particles are not limited as long as the particles have cationic groups, for example, the particles can be produced by using any one of the polymerizable monomers given below. Examples of polymerizable monomers for imparting monofunctional cationy include acrylic esters having tertiary amines such as N,N-dimethylaminoethyl methacrylate, N,N-dimethylaminoethyl acrylate, N,N-dimethylaminopropyl methacrylate, and N,N-dimethylaminopropyl acrylate; acrylamides having tertiary amines such as N,N-dimethylaminoacrylamide, N,N-dimethylaminomethacrylamide, N,N-dimethylaminopropyl acrylamide, N,N-dimethylaminoethyl acrylamide, N,N-dimethylaminoethyl methacrylamide, N,N-dimethylaminopropyl methacrylamide, N,N-dimethylamino-2-hydroxypropylacrylamide, N,N-dimethylamino-2-hydroxypropylmethacrylamide, and the like. When the monomers having tertiary amines are used, they are neutralized with an acid and dissolved in water. The monomers may be quaternized by a known method.

As an advantageous method for producing the cationic fine particles, the fine particles are produced by using a polyfunctional cationic compound having one or more cation groups and two or more polymerizable groups in a molecule. Such a compound can be easily prepared by the methods below. Namely, a compound having a cationic group and crosslinking group can be obtained by the methods descried below.

(1) Polyepoxide having three or more epoxy groups is quaternized with one or more amines, and esterified with two or more acrylic acids.

(2) An acryl monomer having tertiary amine, such as dimethylaminoethyl (meth)acrylate, is added to polyepoxide having three or more epoxy groups.

(3) At least one acryl group of a polyacryloyl compound having three or more acryloyl groups is cationized by addition reaction with trimethylamine or the like.

As another method for producing the cationic resin fine particles, surfaces of anionic polymer fine particles of a general easily available acrylic polymer or the like are modified with a reactive cationic compound having the following structure:

(Ink Jet Recording Ink)

A description will now be made of the ink for ink jet recording used in a combination with the recording performance improving liquid containing the cationic resin fine particles. The ink contains, for example, an organic pigment (including carbon black) as a colorant. Examples of the organic pigment include the following:

An example of organic pigments used for black ink is carbon black. Examples of carbon black include carbon black produced by a furnace method or channel method, and preferably having the properties that the primary particle diameter is 15 to 40 μm, the specific surface area by a BET method is 50 to 300 m2/g, the DBP oil absorption is 40 to 150 ml/100 g, the volatile content is 0,5 to 10%, and the pH value is 2 to 9. Examples of commercial products having these properties include No. 2300, No. 900, MCF88, No. 33, No. 40, No. 45, No. 52, MA7, MA8, and No. 2200B (produced by Mitsubishi Kasei Corporation); RAVEN1255 (produced by Colombia); REGAL400R, REGAL330R, REGAL660R, and MOGULL (produced by Cabot); Color Black FW1, Color Black FW18, Color Black S170, Color Black S150, Printex 35, and Printex U (produced by Degussa).

Examples of organic pigments used for yellow ink include C. I. Pigment Yellow 1, C. I. Pigment Yellow 2, C. I. Pigment Yellow 3, C. I. Pigment Yellow 10, C. I. Pigment Yellow 12, C. I. Pigment Yellow 13, C. I. Pigment Yellow 16, C. I. Pigment Yellow 83, and the like.

Examples of organic pigments used for magenta ink include C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112, C. I. Pigment Red 122, and the like.

Examples of organic pigments used for cyan ink include C. I. Pigment Blue 1, C. I. Pigment Blue 2, C. I. Pigment Blue 3, C. I. Pigment Blue 15:3, C. I. Pigment Blue 16, C. I. Pigment Blue 22, C. I. Vat Blue 4, C. I. Vat Blue 6, and the like. However, in the present invention, the organic pigment is not limited to these pigments, and for example, organic pigments newly produced for the present invention may also be used.

The concentration of the organic pigment in the ink is generally 1 to 20% by mass, and preferably 2 to 12% by mass, based on the total weight of the ink. However, for a natural image or the like in which gray-scale recording is considered as important, an ink containing a small amount of pigment, i.e., a pale ink, is preferably used. For example, the pigment concentration of a pale ink is preferably in the range of 0.1 to 2% by mass.

Since the ink contains the organic pigment as the colorant, the ink is preferably prepared by using a dispersant for uniformly dispersing the pigment in the ink. As the dispersant used for this purpose, a water-soluble resin can be used. Although any water-soluble resin can be used, particularly, a resin preferably having a weight average molecular weight in the range of 1,000 to 30,000, more preferably in the range of 3,000 to 15,000, can be preferably used in the present invention.

Examples of such a dispersant include block copolymers, random copolymers, graft copolymers or salts thereof of at least two monomers (including at least one hydrophilic monomer) selected from styrene, styrene derivatives, vinylnaphtalene, vinylnaphthalene derivatives, α, β-ethylenically unsaturated carboxylic acid aliphatic alcohol esters, acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamide, and derivatives thereof. Also, natural resins such as rosin, schellac, starch, and the like can be preferably used. These resins are soluble in aqueous solutions in which a base is dissolved, and are thus alkali-soluble resins. The water-soluble resin used as the dispersant for the pigment is preferably contained in the range of 0.1 to 5% by mass based on the total weight of the ink.

The zeta potentials of the ink jet ink and the recording performance improving liquid, which constitute the ink set of the present invention, can be controlled by appropriately selecting various factors such as the type of the dispersant, the mixing ratio of the pigment and the dispersant for preparing a dispersion solution using the pigment and the dispersant, the acid value and molecular weight of the used dispersant, pH of the ink, etc. In the image forming method of the present invention, a typical example of means for improving printability such as feathering, bleeding, coloring, and the like uses, for example, a dispersant having a high acid value for introducing functional groups for stabilizing dispersion of the pigment, such as carboxyl groups or the like, into the pigment surface at a high density.

In order to more effectively achieve the object of the present invention, preferably, the components of the ink set are appropriately selected so that the difference between the average particle diameters of the cationic resin fine particles used for the recording performance improving liquid and the pigment particles used for the ink is 0.15 μm or less. Namely, by setting the difference between the average particle diameters in such a range, reaction between the cationic fine particles and the pigment particles is effectively accelerated on the paper to improve all of the properties such as feathering, bleeding, the fixing speed, coloring, etc. Also, when the difference between the average particle diameters is set in the above range, it is possible to effectively suppress deterioration in the coloring property due to crystallization of the pigment fine particles on the paper, and the occurrence of feathering and bleeding due to deterioration in reactivity with the cationic resin fine particles.

Like measurement of the zeta potential, the average particle diameter can be measured by any one of conventional known methods. Specifically, the average particle diameter can be measured by dynamic light scattering using an apparatus (trade name: ELS-800; produced by Otsuka Electronic Co., Ltd.).

In a preferred form of the ink jet recording ink of the present invention, the whole ink is preferably adjusted to neutral or alkali. This can improve the solubility of the water-soluble resin used as the pigment dispersant to form the ink having excellent long-term storage quality. Particularly, in view of corrosion of various members used in an ink jet recording apparatus, the pH of the ink is preferably in the range of 7 to 10.

Examples of pH adjustors used according to demand include organic amines such as diethanolamine, triethanolamine, and the like; inorganic alkali agents such as alkali metal hydroxides such as sodium hydroxide, lithium hydroxide, potassium hydroxide, and the like; organic acids; mineral acids; and the like.

In the present invention, the recording performance improving liquid preferably further contains a cationic surfactant. This can preferably suppress the occurrence of bleeding in formation of a color image.

Preferred examples of the cationic surfactant include primary, secondary and tertiary amine salt compounds such as hydrochlorides of lauryl amine, palm amine, stearyl amine, rosin amine, and the like; quaternary ammonium compounds such as cetyltrimethylammonium chloride, lauryltrimethylammonium chloride, lauryltributylammonium chloride, benzyltributylammonium chloride, benzalconium chloride, and the like; ampholytic surfactants exhibiting cationy in a certain pH region, such as amino acid-type ampholytic surfactants, betaine compounds, and the like, which are adjusted to pH of the isoelectric point or less. Of course, the present invention is not limited to these compounds. In the present invention, among the compounds, quaternary ammonium compounds are preferably used. The content of the cationic material in the recording performance improving liquid is preferably in the range of 0.1 to 15% by mass, and more preferably in the range of 0.1 to 5% by mass.

In order to further increase the fixing speed of a material recorded on the recording medium by using the ink set of the present invention, the recording performance improving liquid preferably further contains a nonionic surfactant. By adding the nonionic surfactant, liquid components other than the coloring component applied to the paper are rapidly permeated into the paper to prevent the ink from adhering to a hand even when the recorded portion is touched with the hand immediately after recording. The amount of the nonionic surfactant added is 0.05 to 10% by mass, and preferably 0.2 to 5% by mass.

In order to prevent the occurrence of bleeding and improve the fixing speed, it is also effective to further add a polyvalent metal ion to the recording performance improving liquid regardless of the presence of the cationic surfactant and the nonionic surfactant. Particularly, when high-speed recording by a single pass is taken into consideration, it is very effective to use the recording performance improving liquid containing the polyvalent metal ion. Examples of the polyvalent metal ion include bivalent metal ions such as $Ca^{2+}$, $Cu^{2+}$, $Ni^{2+}$, $Mg^{2+}$, $Zn^{2+}$, and the like; trivalent metal ions such as $Fe^{3+}$, $Al^{3+}$, and the like. The recording performance improving liquid of the present invention causes substantially no change in physical properties, such as gelation and the like even when the cationic surfactant, the nonionic surfactant, and the polyvalent metal ion are added to the recording performance improving liquid. This is a very advantageous property for applying the recording performance improving liquid to the recording medium by a droplet discharge method such as the so-called ink jet method. The suitable concentration of the polyvalent metal ion in the recording performance improving liquid depends upon the valence and type of the metal ion added, but the concentration is preferably in the range of about 0.1 to 10% by mass based on the total mass of the recording performance improving liquid.

The recording performance improving liquid is prepared by dispersing or dissolving the cationic resin fine particles, and if required, further the cationic surfactant, the nonionic surfactant and the polyvalent metal salt (a salt of any one of the above polyvalent metal ions and an anion such as $Cl^-$, $NO_3^-$, $SO_4^-$, or the like) in an aqueous medium. As the aqueous medium, water or a mixture of water and a water-soluble organic solvent is preferably used. Examples of available water-soluble organic solvents include polyhydric alcohols such as glycerin, and the like; monohydric alcohols such as isopropanol and the like; amides such as N-methyl-2-pyrrolidone, dimethylformamide, dimethylacetamide, and the like; ketones such as acetone, and the like; ethers such as tetrahydrofuran, dioxane, and the like; polyalkylene glycols such as polyethylene glycol, and the like; alykylene glycols such as ethylene glycol, propylene glycol, and the like; lower alkyl ethers of polyhydric alcohols such as triethylene glycol monomethyl ether, and the like. The content of the water-soluble organic solvent in the recording performance improving liquid is in the range of 5 to 60% by mass, and preferably in the range of 5 to 50% by mass.

As the water contained in the recording performance improving liquid, ion-exchange water is preferably used. The water content in the recording performance improving liquid is in the range of 20 to 80% by mass, and preferably in the range of 40 to 80% by mass.

The ink for ink jet recording is obtained by preparing a pigment dispersed solution using the organic pigment and, if required, the dispersant, and then dispersing the dispersed solution in an aqueous medium. As the aqueous medium, a mixture of water and a water-soluble organic solvent can be preferably used. As the water, ion-exchange water (deionized water) is preferably used, not general water containing various types of ions.

In this case, examples of the water-soluble organic solvent mixed with water include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones or ketoalcohols such as acetone, diacetone alcohol, and the like; ethers such as tetrahydrofuran, dioxane, and the like; polyalkylene glycols such as polyethylene glycol, polypropylene glycol, and the like; alkylene glycols each having an alkylene group having 2 to 6 carbon atoms, such as ethylene glycol, propylene glycol, butylene glycol, triethylene glycol, 1,2,6-hexanetriol, thiodiglycol, hexylene glycol, diethylene glycol, and the like; lower alkyl ethers of polyhydric alcohols, such as glycerin, ethylene glycol monomethyl(or ethyl)ether, diethylene glycol methyl(or ethyl)ether, triethylene glycol monomethyl(ethyl)ether, and the like; N-methyl-2-pyrrolidone; 2-pyrrolidone; 1,3-dimethyl-2-imidazolidinone; and the like. Among these water-soluble organic solvents, polyhydric alcohols such as diethylene glycol and the like, and lower alkyl ethers of polyhydric alcohols such as triethylene glycol monomethyl (or ethyl)ether and the like are preferably used.

The content of the water-soluble organic solvent in the ink is generally in the range of 3 to 50% by mass, and preferably in the range of 3 to 40% by mass, based on the total weight of the ink. The water content of the ink is in the range of 10 to 90% by mass, and preferably in the range of 30 to 80% by mass, based on the total mass of the ink.

Besides the above components, a surfactant, an antifoaming agent, an antiseptic agent, and the like can be appropriately added to the ink jet recording ink in order to obtain the ink having desired physical property values according to demand. Besides the pigment, a water-soluble dye or the like can also be appropriately added as a colorant. Furthermore, the ink jet recording ink preferably has higher surface tension than the recording performance improving liquid combined with the ink. Therefore, the surfactant, and the like are preferably contained in the ink so that the surface tension of the ink is higher than the recording performance improving liquid.

The ink containing the pigment and the other components is prepared by the method below. First, the pigment is added to an aqueous medium containing at least the water-soluble resin as the dispersant and water, and the resultant mixture is stirred, and dispersed by the dispersion means described below, and then centrifuged according to demand to obtain a desired pigment dispersed solution. Then, an aqueous medium, and the additives properly selected from the above-described components are added to the pigment dispersed solution, followed by stirring to form the ink used in the present invention.

In use of the above alkali-soluble resin as the dispersant, a base must be added for dissolving the resin. Examples of the base include organic amines such as monoethanolamine, diethanolaminei triethanolamine, amine methylpropanol, ammonia, and the like; and inorganic bases such as potassium hydroxide, sodium hydroxide, and the like.

In the method of preparing the ink containing the pigment, it is effective to perform premixing for 30 minutes or more before stirring and dispersion of the aqueous medium containing the pigment. Namely, the premixing operation is preferred because wettability of the pigment surfaces can be improved, and adsorption of the dispersant on the pigment surfaces can be accelerated.

As a dispersing machine, any of general dispersing machines can be used for dispersing of the pigment. Examples of the dispersing machine include a ball mill, a roll mill, a sand mill, and the like. Particularly, a high-speed sand mill is preferably used. Examples of such a sand mill include Supermill, Sand Grinder, Beads Mill, Agitator Mill, Grain Mill, Dynomill, Pearl Mill, and Cobol Mill (all trade names), and the like.

In preparing the ink jet recording ink, the organic pigment having an optimum particle diameter distribution is preferably selected in consideration of suitability for ink jet recording, such as resistance to clogging of ink jet nozzles, and the like. However, a method of obtaining the pigment having the desired particle diameter distribution comprises decreasing the size of a grinding medium of a dispersing machine, increasing the filling rate of the grinding medium, extending the treatment time, decreasing the discharge rate, or classifying the pigment by a filter or centrifugal machine after grinding, or a combination of these methods.

A description will now be made of an image forming method of the present invention. The image forming method of present invention is characterized by using the above-described ink set of the present invention. In the image forming method of the present invention, the recording performance improving liquid is preferably discharged by the ink jet recording method to form an image on the recording medium. The ink jet recording method used preferably comprises applying a recording signal to the ink of a recording head to discharge ink droplets by the heat energy generated.

Figure 1:
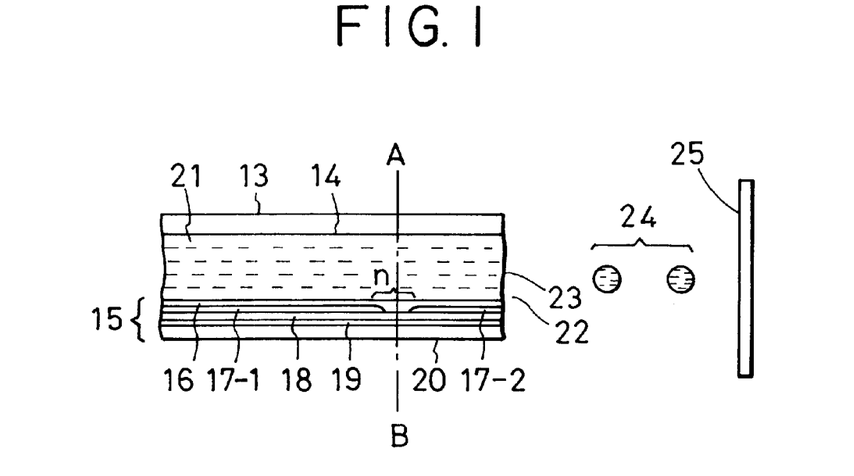
FIG. 1 is a perspective view showing an ink jet recording apparatus.
Figure 2:
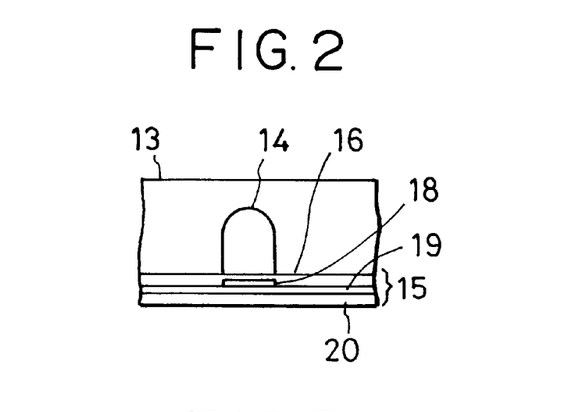
FIG. 2 is a sectional view taken along line B—B in FIG. 1.
Figure 3:
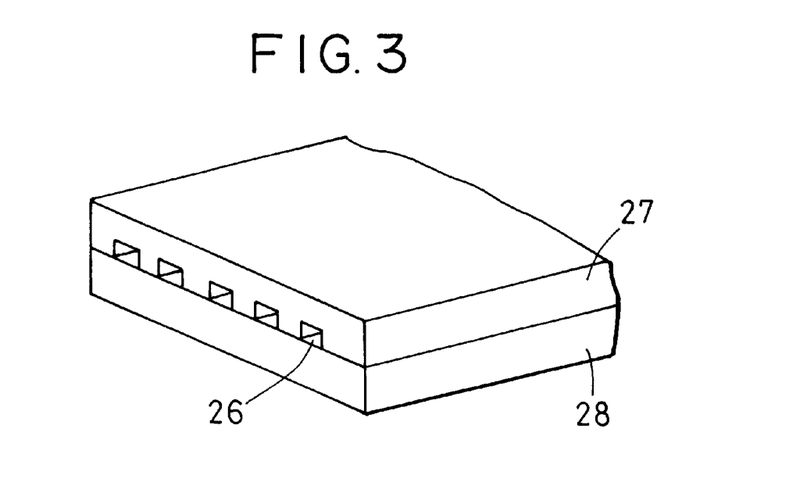
FIG. 3 is a drawing of the appearance of a multi-head comprising a plurality of the nozzles shown in FIG. 1.

FIGS. 1 to 3 show an example of the construction of a recording head serving as a principal portion of an ink jet recording apparatus which can be applied to the image forming method of the present invention.

In FIG. 1, a head 13 is obtained by bonding together a glass, ceramic or plastic plate having a channel 14 for passing the ink therethrough, and an exothermic head 15 (not limited to the head shown in the drawing) having an exothermic body used for heat-sensitive recording. The exothermic head 15 comprises a protecting film 16 made of silicon oxide or the like, aluminum electrodes 17-1 and 17-2, an exothermic body layer 18 made of nichrome or the like, a heat storage layer 19, and a substrate 20 made of alumina or the like having a good heat release effect. An ink 21 reaches a discharge orifice (fine hole) 22, and forms a meniscus 23 under pressure not shown in the drawing.

When an electric signal is applied between the electrodes 17-1 and 17-2, heat is rapidly generated from region n of the exothermic head 15 to produce bubbles in the ink 21 in contact with the region n. The meniscus 23 is projected by the pressure of the bubbles to discharge the ink 21 as recording droplets 24 from the orifice 22. The recording droplets 24 fly toward a recording medium 25.

FIG. 3 shows the appearance of a multihead comprising a plurality of the nozzles shown in FIG. 1. The multihead is formed by bonding together a glass plate 27 having a plurality of channels 26, and the same exothermic head 28 as shown in FIG. 1. FIG. 1 is a sectional view of the recording head 13 taken along the ink passage, and FIG. 2 is a sectional view taken along line A–B in FIG. 1.

Figure 4:
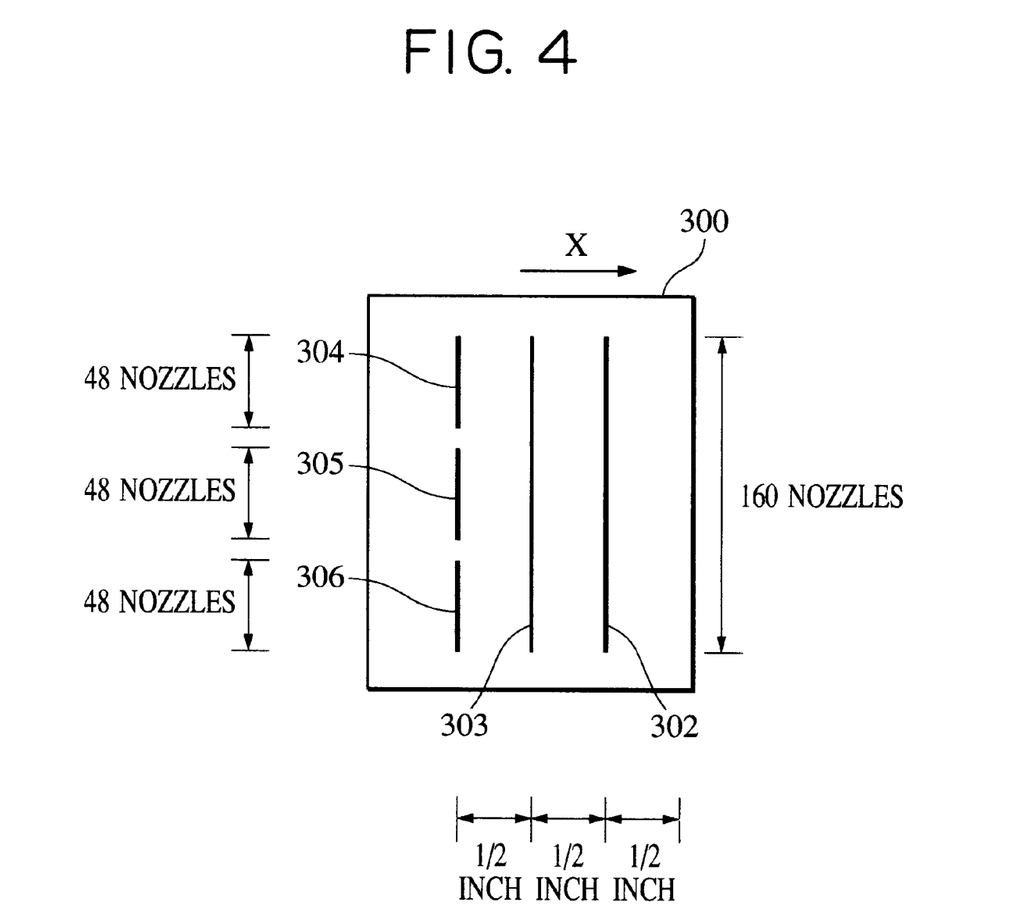
FIG. 4 is a drawing illustrating a heat unit.

FIG. 4 is a drawing illustrating a head unit used in the present invention. In the construction shown in FIG. 4, a recording performance improving liquid (S1) chip 302, a black (Bk) ink chip 303, and an integrated structure comprising a yellow (Y), magenta (M) and cyan (C) chips 304, 305 and 306 are fixed to a frame 300. The chips are fixed with an equal interval of ½ inch in the main operation direction X. The number of nozzles of each of the chips 302 and 303 is 160, and the number of nozzles of each of the chips 304, 305 and 306 is 48. The chips 304, 305 and 306 are spaced with a distance corresponding to 8 nozzles to separate the respective ink chips.

A region of the recording medium in which the recording performance improving liquid is adhered is the same as a region in which an image of each of the inks is formed, and the printing duties of all the recording performance improving liquid and the inks are 100%.

A description will now be made of the method of forming an image with the inks of yellow (Y), magenta (M), cyan (C) and black (Bk), and the recording performance improving liquid by using the head unit shown in FIG. 4.

The recording heads shown in FIG. 4 discharge the respective color inks according to recording signals. The recording performance improving liquid (including YMC recording performance improving liquids for Y, M and C inks, and a Bk ink recording performance improving liquid for Bk ink) is adhered to an image region in which at least the corresponding color ink is adhered, before or after the corresponding color ink is adhered. Each of the recording heads is moved by a carriage in the direction X shown in the drawing, and the recording medium is moved upward by feed rollers or the like.

The image forming method of the present invention can be applied to all apparatuses using paper or cloth, leather, nonwoven fabric, OPH paper, or the like, a printing material (recording medium) such as a metal or the like. Examples of apparatuses to which the image forming method of the present invention can be applied include office equipments such as a printer, a copying machine, a facsimile, and the like; industrial production apparatuses; and the like.

Although the above description of the recording method and the recording apparatus concerns the case in which the recording performance improving liquid is adhered to the recording medium by using the droplet discharge method such as the ink jet recording method, the present invention is not limited to case. The present invention can be applied to a method in which the recording performance improving liquid is applied over the entire surface of the recording medium by using a roller or a spray, and then the ink jet recording ink is applied to the recording medium, and a method in which the recording performance improving liquid is applied to the recording medium by using droplet discharge means, a roller or a spray after the ink jet recording ink is applied to the recording medium.

EXAMPLES

The present invention is described in further detail below with reference to examples. In the description below, "parts"

and "%" are based on mass unless otherwise specified. The pigment-based ink used in each of examples and comparative examples was prepared as follows. Of course, the ink used in the present invention is not limited to these inks.

<Preparation of Pigment-based Ink>

The four resins (resins A to D) shown in Table 1 below were prepared as dispersion resins used for preparing pigment dispersed solutions.

TABLE 1

| | | Monomer loading ratio in polymerization | | | |
|---|---|---|---|---|---|
| | | Styrene | Acrylic acid | HEMA (Hydroxyethyl methacrylate) | Acid value | Average molecular weight |
| Resin A | Styrene-acrylic acid copolymer | 7 | 3 | — | 200 | 8000 |
| Resin B | Styrene-acrylic acid-HEMA copolymer | 5 | 3 | 2 | 200 | 8000 |
| Resin C | | 3 | 3 | 4 | 200 | 8000 |
| Resin D | | 2 | 3 | 5 | 200 | 8000 |

(Preparation of Pigment Dispersed Solution 1)

| Resin A | 5 parts |
|---|---|
| Triethanol amine | 10.7 part |
| Diethylene glycol | 3 parts |
| Water | 91.3 parts |

The above components were mixed, and heated to 80° C. by a water bath to completely dissolve the resin component. Then, 21.2 parts of carbon black "MA-100" (produced by Mitsubishi Chemical Co., Ltd.) and 6 parts of 2-propanol were added to the resultant solution, followed by premixing for 30 minutes and dispersion under the following conditions:

Dispersing machine: Sand Grinder (produced by Igarashi Kikai)

Grinding medium: zirconium beads having a diameter of 1 mm

Filling rate of grinding medium: 60% (volume)

Grinding time: 5 hours

Furthermore, centrifugation (12,000 rpm, 20 minutes) was performed to remove coarse particles, forming pigment dispersed solution 1.

(Preparation of Pigment-based Ink Bk-1)

The components below including the pigment dispersed solution 1 prepared as described above were mixed in a beaker, and then agitated at 25° C. of 3 hours to obtain pigment-based ink Bk-1.

| Pigment dispersed solution 1 | 30 parts |
|---|---|
| Diethylene glycol | 8 parts |
| 2-propanol | 2 parts |
| Water | 60 parts |

The carbon black dispersed in the pigment-based ink Bk-1 obtained as described above had an average particle diameter of 0.12 μm. The content of the carbon black in the ink was 5% by mass. The pH of the pigment-based in Bk was 9.0, and the zeta potential of the ink measured by the above-described method was −55 mV.

(Preparation of Pigment-based Inks Bk-2 to 4, Y-1 to 4, M-1 to 4 and C-1 to 4)

The pigment-based inks were prepared by the same method as the pigment-based ink Bk-1 except that the pigment, the dispersion resin, and the pigment content of the pigment-based ink Bk-1 were changed as shown in Table 2 below.

TABLE 2

| | | Particles contained in liquid | |
|---|---|---|---|
| Composition of ink set | Dispersion resin | Type of particles | Content (% by mass) |
| Pigment-based ink | | | |
| Bk-1 | A | Carbon Black MA100 | 5 |
| Y-1 | B | Pigment Yellow 10 | 3.2 |
| M-1 | B | Pigment Red 122 | 3.5 |
| C-1 | C | Pigment Blue 15:3 | 3.5 |
| Pigment-based ink | | | |
| Bk-2 | B | Carbon Black MA100 | 4.5 |
| Y-2 | A | Pigment Yellow 12 | 4.5 |
| M-2 | C | Pigment Red 5 | 4.5 |
| C-2 | C | Pigment Blue 15:3 | 4.5 |
| Pigment-based ink | | | |
| Bk-3 | B | Carbon Black MA100 | 4.5 |
| Y-3 | B | Pigment Yellow 10 | 3.5 |
| M-3 | C | Pigment Red 5 | 3.5 |
| C-3 | B | Pigment Blue 15:3 | 3.5 |
| Pigment-based ink | | | |
| Bk-4 | D | Carbon Black MA100 | 4.5 |
| Y-4 | D | Pigment Yellow 10 | 3.5 |
| M-4 | D | Pigment Red 122 | 3.5 |
| C-4 | D | Pigment Blue 15:3 | 3.5 |

<Preparation of Recording Performance Improving Liquid>

Next, the recording performance improving liquid used in each of the examples and comparative examples was prepared as described below. Namely, the recording performance improving liquid was prepared by using cationic fine particles previously formed.

[Preparation of Recording Performance Improving Liquid S-1]

(Synthesis of Cationic Fine Particles (Ct-1))

25 g of water and 25 g of isopropyl alcohol were added to 80 g of quaternized hydrochloride of N,N-dimethylamino-2-hydroxypropylacrylamide and 20 g of methylene bisacrylamide, and 1.0 g of azobiscyanovaleric acid was added as a polymerization catalyst to the resultant mixture. Also, Phosphanol RS-410 (trade name, phosphate of the ethylene oxide addition product of tridecyl alcohol, produced by Toho Chemical Co., Ltd.) was used as an emulsifier. The resultant mixture was added dropwise to a solvent comprising 200 g of a mixture of methyl ethyl ketone and ethylene glycol monomethyl ether (mixing ratio 50:50), and then emulsified under stirring to obtain a fine particle dispersed solution. The emulsification conditions included a rotational speed of 8,000 rpm, and a time of 15 minutes. The thus-obtained fine particle dispersed solution was well stirred in ethylene glycol monomethyl ether and water to remove the emulsifying liquid, thereby synthesizing cationic fine particles (Ct-1). After synthesis, the cationic fine particles (Ct-1) were dried by heating at 80° C. for 10 hours.

The recording performance improving liquid S-1 having the composition below was prepared by using the cationic fine particles (Ct-1) obtained as described above.

| | |
|---|---|
| Cationic fine particles (Ct-1) | 4 parts |
| Benzalconium chloride | 1 part |
| (Cation G50, produced by | |
| Sanyo Chemical Industries, Ltd.) | |
| Ethylene oxide addition product of | 1 part |
| acetylene alcohol (trade name: | |
| Acetylenol EH, produced by Kawaken Fine | |
| Chemicals Co., Ltd.) | |
| Diethylene glycol | 15 parts |
| Water | 79 parts |

The above components were mixed and sufficiently stirred, and then filtered with Fluoropore Filter (trade name: produced by Sumitomo Electric Industries Co., Ltd.) under pressure to obtain-recording performance improving liquid S-1 of pH 7. The zeta potential of the thus-obtained recording performance improving liquid S-1 was 20 mV.

[Preparation of Recording Performance Improving Liquid S-2]

(Synthesis of Cationic Fine Particles (Ct-2))

Cationic fine particle (Ct-2) were synthesized under the same conditions as those for synthesizing the cationic fine particles (Ct-1) except that the amount of quaternized hydroxide of N,N-dimethylamino-2-hydroxypropylacrylamide and the amount of methylenebisacrylamide were 90 g and 10 g, respectively.

The recording performance improving liquid S-2 having the composition below was prepared by using the cationic fine particles (Ct-2) obtained as described above.

| | |
|---|---|
| Cationic fine particles (Ct-2) | 4 parts |
| Benzalconium chloride | 2.1 part |
| (Cation G50, produced by | |
| Sanyo Chemical Industries, Ltd.) | |
| Ethylene oxide addition product of | 1.5 part |
| acetylene alcohol (trade name: | |
| Acetylenol EH, produced by | |
| Kawaken Fine Chemicals Co., Ltd.) | |
| Diethylene glycol | 15 parts |
| Water | 77.9 parts |

[Preparation of Recording Performance Improving Liquid S-3]

(Synthesis of Cationic Fine Particles (Ct-3))

Cationic fine particle (Ct-3) were synthesized under the same conditions as those for synthesizing the cationic fine particles (Ct-1) except that the amount of quaternized hydroxide of N,N-dimethylamino-2-hydroxypropylacrylamide and the amount of methylenebisacrylamide were 70 g and 30 g, respectively.

The recording performance improving liquid S-3 having the composition below was prepared by using the cationic fine particles (Ct-3) obtained as described above.

| | |
|---|---|
| Cationic fine particles (Ct-3) | 3.5 parts |
| Benzalconium chloride | 1.0 part |
| (Cation G50, produced by Sanyo | |
| Chemical Industries, Ltd.) | |
| Ethylene oxide addition product of | 1.0 part |
| acetylene alcohol (trade name: | |
| Acetylenol EH, produced by | |
| Kawaken Fine Chemicals Co., Ltd.) | |
| Diethylene glycol | 15 parts |
| Water | 79.5 parts |

[Preparation of Recording Performance Improving Liquid S-4]

(Synthesis of Cationic Fine Particles (Ct-4))

Cationic fine particle (Ct-4) were synthesized under the same conditions as those for synthesizing the cationic fine particles (Ct-1) except that the amount of quaternized hydroxide of N,N-dimethylamino-2-hydroxypropylacrylamide and the amount of methylenebisacrylamide were 20 g and 80 g, respectively.

The recording performance improving liquid S-4 having the composition below was prepared by using the cationic fine particles (Ct-4) obtained as described above.

| | |
|---|---|
| Cationic fine particles (Ct-4) | 3.5 parts |
| Benzalconium chloride | 0.2 part |
| (Cation G50, produced by | |
| Sanyo Chemical Industries, Ltd.) | |
| Diethylene glycol | 15 parts |
| Water | 81.3 parts |

Examples 1 to 3 and Comparative Example 1

The pigment inks having the above-described compositions, and the recording performance improving liquids S-1 to S-4 were used in the combinations shown in Table 3 below to obtain ink sets of Examples 1 to 3 and Comparative Example 1.

TABLE 3

| | Zeta potential (mV) | | Average particle diameter ($\mu$m) | | |
|---|---|---|---|---|---|
| Composition of ink set | Measured value | Difference from improving liquid | Measured value | Difference from improving liquid | Surface tension (mN/m) |
| Example 1 | | | | | |
| Pigment-based ink | | | | | |
| Bk-1 | −55 | 75 | 0.12 | 0.04 | 45 |
| Y-1 | −39 | 59 | 0.15 | 0.07 | 40 |
| M-1 | −42 | 62 | 0.13 | 0.05 | 41 |
| C-1 | −20 | 40 | 0.19 | 0.11 | 45 |
| Recording performance improving liquid S-1 | +20 | — | 0.08 | — | 35 |
| Example 2 | | | | | |
| Pigment-based ink | | | | | |
| Bk-2 | −40 | 71 | 0.09 | 0.03 | 46 |
| Y-2 | −50 | 81 | 0.16 | 0.10 | 38 |
| M-2 | −34 | 65 | 0.12 | 0.06 | 43 |

TABLE 3-continued

| Composition of ink set | Zeta potential (mV) | | Average particle diameter (μm) | | Surface tension (mN/m) |
|---|---|---|---|---|---|
| | Measured value | Difference from improving liquid | Measured value | Difference from improving liquid | |
| C-2 | −20 | 51 | 0.14 | 0.08 | 41 |
| Recording performance improving liquid S-2 | +31 | — | 0.06 | — | 29 |
| Example 3 | | | | | |
| Pigment-based ink | | | | | |
| Bk-3 | −40 | 56 | 0.14 | 0.02 | 43 |
| Y-3 | −38 | 54 | 0.15 | 0.03 | 43 |
| M-3 | −29 | 45 | 0.2 | 0.08 | 43 |
| C-3 | −31 | 47 | 0.13 | 0.01 | 40 |
| Recording performance improving liquid S-3 | +16 | — | 0.12 | — | 31 |
| Comparative Example 1 | | | | | |
| Pigment-based ink | | | | | |
| Bk-4 | −20 | 25 | 0.25 | 0.22 | 30 |
| Y-4 | −15 | 20 | 0.21 | 0.18 | 31 |
| M-4 | −12 | 17 | 0.24 | 0.21 | 28 |
| C-4 | −9 | 14 | 0.3 | 0.27 | 40 |
| Recording performance improving liquid S-4 | +5 | — | 0.03 | — | 50 |

(Evaluation)

In order to evaluate each of the ink sets of Examples 1 to 3 and Comparative Example 1 having the compositions shown in Table 3, ink jet recording was carried out by the recording method below to evaluate the items described below. As a recording apparatus, an ink jet recording apparatus was used, in which ink jet heads (600 dpi) were arranged in the main scanning direction, for discharging ink droplets by applying heat energy to the inks in the recording heads. Recording was preformed on each of various recording media such as commercial PPC paper, bonded paper, and recycled paper by using each of the ink sets. Also, recording was performed by using the head unit shown in FIG. 4 and all the Y ink, M ink, C ink and Bk ink in the combinations shown in Table 1 so that a solid print area was 2 cm×2 cm, and solid print areas of the respective colors were adjacent to each other. After air drying in a room for 12 hours, the occurrence of bleeding at the boundaries between the respective print areas was observed. Each of the solid print areas was formed in a multipass mode (in which one pixel was printed by four scanning), i.e., a four-pass mode.

The discharge rate of each of the color inks of Bk, Y, M and C colors, and the recording performance improving liquid was about 8 pl/dot. The area of each of recording media in which each of the recording performance improving liquids was adhered for forming an image was the same as the area in which an ink image was formed. All print duties were 100%.

The evaluation items, evaluation method and evaluation criteria were as follows:

(1) Feathering

After an alphanumeric character was printed, and then dried with air in a room for 12 hours, print quality was evaluated with attention to the occurrence of feathering based on the following criteria. The results are shown in Table 2.

A: Substantially no feathering
B: Slight feathering with no practical problem
C: Significant feathering with no practical problem
D: Significant feathering with a practical problem (2) Bleeding After an alphanumeric character was printed, and then dried with air in a room for 12 hours, print quality was evaluated with attention to the occurrence of bleeding based on the following criteria. The results are shown in Table 2.

A: Substantially no bleeding
B: Slight bleeding with no practical problem
C: Significant bleeding with no practical problem
D: Significant bleeding with a practical problem (3) Fixing Property Solid printing of 2 cm×2 cm was performed copy paper produced by Canon Inc. by using Canon BJF-850 comprising each of the inks, and another sheet of white paper was superposed on the recorded image by its own weight. The time taken until no image recorded on the copy paper was transferred to the back of the white paper, i.e., no staining occurred on the background, was measured to evaluate the fixing property based on the criteria below. The results are shown in Table 2. When the fixing time was less than 20 seconds, the fixing property was evaluated as good.

A: Fixing time of less than 10 seconds
B: Fixing time of 10 seconds or more, and less than 20 seconds
C: Fixing time of 20 seconds or more, and less than 30 seconds
D: Fixing time of 30 seconds or more (4) Coloring Property Solid printing of 2 cm×2 cm was performed on each of copy paper produced by Canon Inc. and ink jet coated paper (Professional Photopaper PR-101) produced by Canon Inc. as a comparative example by using Canon BJF-850 comprising each of the ink sets. The coloring property of the print formed on each paper was visually observed to evaluate the function based on the criteria below. The obtained results are shown in Table 2.

A: Substantially the same coloring as ink jet coated paper was observed on copy paper.
B: The coloring property of copy paper was not equivalent to ink jet coated paper, but significantly close to the ink jet coated paper.
C: The coloring property of copy paper was different from ink jet coated paper, but relatively close to the ink jet coated paper.
D: The coloring property of copy paper was clearly different from ink jet coated paper.

The results of each of the evaluations are shown in Table 4 below.

TABLE 4

| | Evaluation results | | | |
|---|---|---|---|---|
| | Feathering | Bleeding | Fixing property | Coloring property |
| Example 1 | A | A | B | A |
| Example 2 | A | A | A | A |

TABLE 4-continued

| | Evaluation results | | | |
|---|---|---|---|---|
| | Feathering | Bleeding | Fixing property | Coloring property |
| Example 3 | A | B | A | B |
| Comparative Example 1 | D | C | D | C |

Examples 4 and 5

[Preparation of Recording Performance Improving Liquid S-5]

The recording performance improving liquid S-5 having the composition below was prepared by using cationic fine particles (Ct-1) prepared by the same method as described above.

| | |
|---|---|
| Cationic fine particles (Ct-1) | 4 parts |
| Magnesium nitrate | 3 parts |
| Ethylene oxide addition product of acetylene alcohol (trade name: Acetylenol EH, produced by Kawaken Fine Chemicals Co., Ltd.) | 1 part |
| Diethylene glycol | 15 parts |
| Water | 77 parts |

[Preparation of Recording Performance Improving Liquid S-6]

The recording performance improving liquid S-6 having the composition below was prepared by using cationic fine particles (Ct-1) prepared by the same method as described above.

| | |
|---|---|
| Cationic fine particles (Ct-1) | 4 parts |
| Aluminum sulfate | 2 parts |
| Ethylene oxide addition product of acetylene alcohol (trade name: Acetylenol EH, produced by Kawaken Fine Chemicals Co., Ltd.) | 1 part |
| Diethylene glycol | 15 parts |
| Water | 78 parts |

Each of the above-described pigment-based inks and the recording performance improving liquids S-5 and S-6 were used in the combinations shown in Table 5 below to obtain ink sets of Examples 4 and 5. Table 5 show shows the zeta potential and average particle diameter of each of the inks and the recording performance improving liquids.

TABLE 5

| | Zeta potential (mV) | | Average particle diameter (μm) | | |
|---|---|---|---|---|---|
| Composition of ink set | Measured value | Difference from improving liquid | Measured value | Difference from improving liquid | Surface tension (mN/m) |
| Example 4 | | | | | |
| Pigment-based ink | | | | | |
| Bk-1 | −55 | 73 | 0.12 | 0.03 | 45 |
| Y-1 | −39 | 57 | 0.15 | 0.06 | 40 |
| M-1 | −42 | 60 | 0.13 | 0.04 | 41 |
| C-1 | −20 | 38 | 0.19 | 0.1 | 45 |
| Recording performance improving liquid S-5 | 18 | — | 0.09 | — | 34 |
| Example 5 | | | | | |
| Pigment-based ink | | | | | |
| Bk-1 | −55 | 72 | 0.09 | 0.01 | 46 |
| Y-1 | −39 | 56 | 0.16 | 0.06 | 38 |
| M-1 | −42 | 59 | 0.12 | 0.02 | 43 |
| C-1 | −20 | 37 | 0.14 | 0.04 | 41 |
| Recording performance improving liquid S-6 | 17 | — | 0.1 | — | 28 |

Printing was performed by the same method as Examples 1 to 3 and Comparative Example 1 except that each of the ink sets of Examples 4 and 5 was used to evaluate feathering, bleeding, the fixing property and the coloring property.

For a print area formed by the same method as described above except the print area of 2 cm×2 cm was formed by a single pass mode (in which one pixel was printed by one operation of adhering a plurality of ink droplets), the occurrence of bleeding between respective print areas was observed. The results are shown in Table 6 below.

TABLE 6

| | | Bleeding | | | |
|---|---|---|---|---|---|
| | Feathering | Multipass | Single pass | Fixing property | Coloring property |
| Example 4 | A | A | A | A | A |
| Example 5 | A | A | A | A | A |

The above results indicate that, the use of a recording performance improving liquid containing cationic resin fine particles and a polyvalent metal ion can effectively suppress the occurrence of bleeding even in recording under the condition of single pass easily causing bleeding.

As described above, in an embodiment of the present invention, an image sufficiently satisfying the items of feathering, bleeding, the fixing property, the color tone, etc. can be formed on commercial plain paper.

In another embodiment of the present invention, it is effectively prevent the occurrence of bleeding at the boundary between adjacent areas of two different colors recorded, for example, by a single pass mode.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink set comprising an ink for ink jet and a recording performance improving liquid for improving the recording performance of the ink, wherein the liquid contains at least cationic resin fine particles, and the ink contains an organic pigment as a colorant, and the zeta potentials of the liquid and the ink are different from each other by at least 30 mV.

2. An ink set according to claim 1, wherein the average particle diameter of the resin fine particles measured by a laser Doppler method and that of the organic pigment are different from each other, and the difference is 0.15 µm or less.

3. An ink set according to claim 1, wherein the liquid contains a cationic surfactant.

4. An ink set according to claim 3, wherein the liquid contains both a cationic surfactant and a nonionic surfactant.

5. An ink set according to claim 1, wherein the liquid contains a polyvalent metal ion.

6. An image forming method of forming an image using an ink set according to claim 1 comprising the steps of:

(i) applying the ink by an ink jet method; and (ii) applying the recording performance improving liquid to a recording medium;

wherein the steps (i) and (ii) are performed so as to bring the ink and the liquid into contact with each other on a recording medium.

* * * * *

UNITED STATES PATENT AND TRADEMARK OFFICE
CERTIFICATE OF CORRECTION

PATENT NO.    : 6,547,382 B1              Page 1 of 1
DATED         : April 15, 2003
INVENTOR(S)   : Katsuhiro Shirota et al.

It is certified that error appears in the above-identified patent and that said Letters Patent is hereby corrected as shown below:

Column 4,
Line 65, "general" should read -- generally --.

Column 5,
Line 21, "0,5" should read -- 0.5 --.

Column 9,
Line 11, "diethanolaminei" should read -- diethanolamine, --.

Column 16,
Line 19, "performed" should read -- performed on --.

Column 18,
Line 54, "is" should read -- can --.

Signed and Sealed this

Eleventh Day of November, 2003

JAMES E. ROGAN
*Director of the United States Patent and Trademark Office*